United States Patent [19]

Komamura et al.

[11] 4,272,056
[45] Jun. 9, 1981

[54] ROTARY CONTROL VALVE FOR POWER STEERING SYSTEM

[75] Inventors: Seiji Komamura; Katsuhiro Suzuki, both of Gifu, Japan

[73] Assignee: Kayaba Kogyo Kabushiki Kaisha, Tokyo, Japan

[21] Appl. No.: 111,132

[22] Filed: Jan. 10, 1980

[30] Foreign Application Priority Data

Feb. 9, 1979 [JP] Japan .................. 54-13903

[51] Int. Cl.³ .............................. F16K 11/083
[52] U.S. Cl. ....................... 251/309; 137/625.22; 91/375 A
[58] Field of Search ............ 251/309; 137/625.21, 137/625.22, 625.23, 625.47; 91/375 R, 372, 376 R, 375 A

[56] References Cited

U.S. PATENT DOCUMENTS

| 3,296,939 | 1/1967 | Eddy | 137/625.24 X |
| 3,799,499 | 3/1974 | Shur | 251/309 |

Primary Examiner—Alan Cohan
Attorney, Agent, or Firm—David G. Alexander

[57] ABSTRACT

A control valve (31) for a power steering system or the like has a sleeve (37) with a conical bore (52) and a rotor (47) with a conical outer surface (53) conjugate to the bore (52) for relative rotation therein. The conjugate surfaces of the sleeve (37) and rotor (47) are formed with longitudinal control grooves (54), (56), (57), (58) having bottom surfaces which are parallel to the axis of the valve (31), thereby allowing the sleeve (37) and rotor (47) to be formed in one piece molds and pulled straight out of the molds.

11 Claims, 11 Drawing Figures

ROTARY CONTROL VALVE FOR POWER STEERING SYSTEM

BACKGROUND OF THE INVENTION

The present invention relates to a rotary control valve which is ideally suited for use in, but is not limited to, a power steering system for an automobile, truck, airplane or other vehicle.

A conventional control valve for a power steering system comprises a tubular sleeve and a cylindrical rotor which is disposed in the sleeve for relative sliding rotation. The conjugate surfaces of the sleeve and rotor are formed with grooves which control flow of hydraulic fluid between ports. The ports are connected to a pressurized hydraulic fluid source, a reservoir and the opposite ends of a power piston respectively in such a manner that rotation of a steering wheel and thereby the rotor relative to the sleeve and vehicle direction control members such as wheels from a neutral position causes one end of the power piston to be connected to the pressure source and the other end of the power piston to be connected to the reservoir. This creates a net force on the power piston in a direction such as to assist the steering effort.

However, a conventional control valve having right cylndrical components must be manufactured using machining. Although the main bodies of the sleeve and rotor may be formed in molds, the grooves must be machined and the bodies machined to remove flash created by two piece molds.

SUMMARY OF THE INVENTION

A rotary valve embodying the present invention comprises a sleeve formed with a conical bore and a rotor having a conical outer surface conjugate to the bore and being disposed therein for relative rotation, the sleeve being formed with a longitudinal internal groove which increases in depth but does not extend radially outwardly from an axis of the bore as a diameter of the bore increases, the rotor being formed with a longitudinal external groove which increases in depth but does not extend radially inwardly toward an axis of the rotor as a diameter of the rotor increases.

In accordance with the present invention, a control valve for a power steering system or the like has a sleeve with a conical bore and a rotor with a conical outer surface conjugate to the bore for relative rotation therein. The conjugate surfaces of the sleeve and rotor are formed with longitudinal control grooves having bottom surfaces which are parallel to the axis of the valve, thereby allowing the sleeve and rotor to be formed in one piece molds and pulled straight out of the molds.

It is an object of the present invention to provide a control valve for a power steering system or the like which can be manufactured by molding, forging or sintering without significant machining operations.

It is another object of the present invention to provide a control valve for a power steering system or the like having main components which can be manufactured in one piece molds.

It is another object of the present invention to provide a rotary valve which can be manufactured at major savings in cost and time on a commerical production basis.

It is another object of the present invention to provide a generally improved rotary control valve.

Other objects, together with the foregoing, are attained in the embodiments described in the following description and illustrated in the accompanying drawing.

DESCRIPTION OF THE PREFERRED EMBODIMENTS

While the rotary control valve of the present invention is susceptible of numerous physical embodiments, depending upon the environment and requirements of use, substantial numbers of the herein shown and described embodiments have been made, tested and used, and all have performed in an eminently satisfactory manner.

Figure 1:
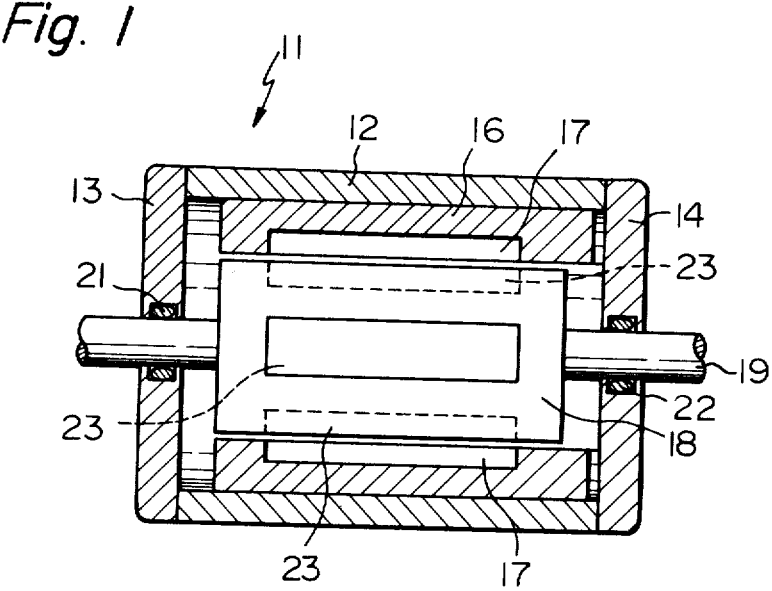
FIG. 1 is a longitudinal sectional view of a prior art rotary control valve.

Referring now to FIG. 1 of the drawing, a prior art rotary control valve is generally designated by the reference numeral 11 and comprises a tubular housing 12. The housing 12 is closed at its opposite ends by end plates 13 and 14. A sleeve 16 having a tubular shape is disposed in the housing 12 for relative sliding rotation. The inner surface of the sleeve 16 is formed with longitudinal grooves 17 having closed ends.

A cylindrical rotor 18 is mounted on a shaft 19 which is rotatably supported by bearings 21 and 22 fitted in holes (not designated) in the walls 13 and 14 respectively. The outer surface of the rotor 18 is conjugate to the inner surface of the sleeve 16 and the rotor 18 is slidably rotatable relative to the sleeve 16. The outer surface of the sleeve 18 is formed with longitudinal grooves 23 having closed ends.

Communication between the grooves 17 depends on the relative angular position between the sleeve 16 and rotor 18. In one position, adjacent grooves 17 are connected to each other via the grooves 23. In another position, the grooves 23 do not align with the grooves 17 and communication is blocked. The sleeve 16 may be held stationary or may be rotatable to constitute a feedback element. The grooves 17 are connected to ports (not shown) which lead to a pump, a load, etc.

The valve 11 is expensive to manufacture due to the configuration of the grooves 17 and 23. Due to the closed ends of the grooves 17 and 23, the sleeve 16 and rotor 18 cannot be produced in one piece molds. The grooves 17 and 23 must be formed by machining, which is an expensive process. If the main bodies of the sleeve 16 and rotor 18 are to be formed by molding, use must be made of two piece molds which leave flash marks which must be removed by machining.

Figure 2:
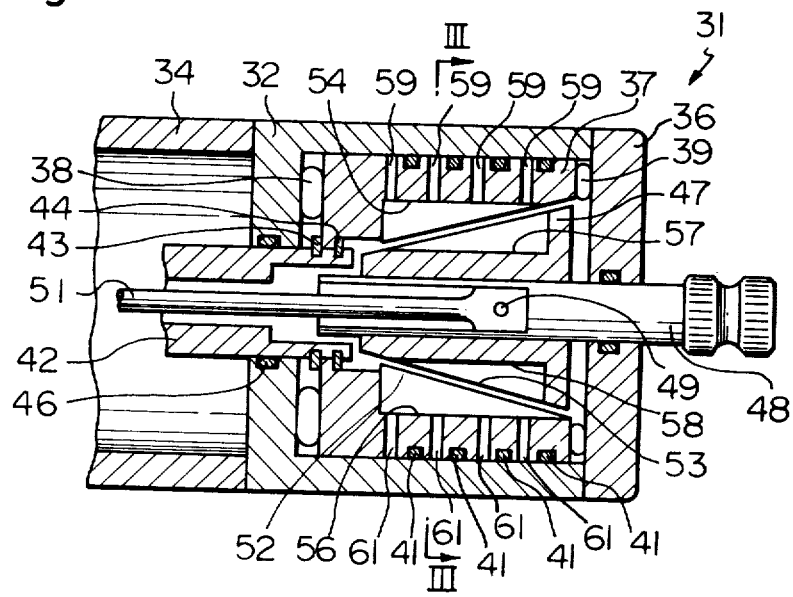
FIG. 2 is a longitudinal sectional view of a rotary control valve embodying the present invention.
Figure 3:
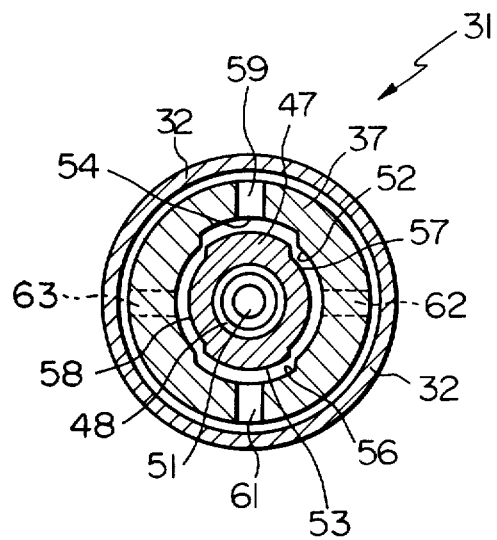
FIG. 3 is a transverse sectional view taken on a line III—III of FIG. 2.
Figure 4:
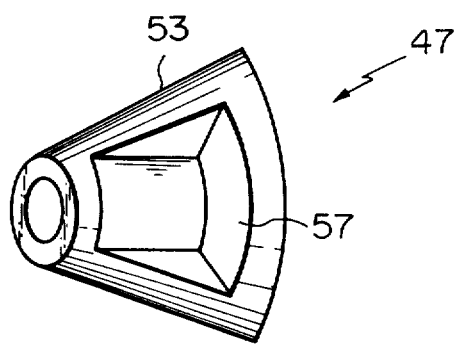
FIG. 4 is a perspective view of a rotor of the valve of FIGS. 2 and 3.

These drawbacks are overcome by a rotary control valve 31 embodying the present invention which is illustrated in FIGS. 2 to 4. The present valve 31 comprises a cup shaped housing 32 which is connected to a housing 34 of a power steering system. The right end of the housing 32 is closed by an end plate 36.

A sleeve 37 having a cylindrical outer surface is rotatably disposed in the housing 32. Thrust bearings 38 and 39 are provided at the opposite ends of the sleeve 37. Further illustrated are O-ring seals 41 provided in grooves (not designated) in the periphery of the sleeve 37.

A worm shaft 42 is splined or otherwise connected to the sleeve 37 so as to be integrally rotatable therewith. Longitudinal relative movement between the worm shaft 42 and sleeve 37 is prevented by snap rings 43 and 44. A bearing 46 supports the worm shaft 42 in the left end of the housing 32.

A rotor 47 having a cylindrical bore is fixed on a stub shaft 48 by a pin 49 for integral rotation. A torsion bar 51 is also fixed at its right end to the stub shaft 48 by the pin 49. The stub shaft 48 is typically connected to a steering wheel (not shown) of a vehicle whereas the left end of the torsion bar 51 is connected to the left end portion of the worm shaft 42 although not illustrated. The worm shaft 42 is connected to a steering gear system (not shown) of the vehicle.

In accordance with an important feature of the present invention, the sleeve 37 is formed with a conical bore 52 which increases in diameter from left to right as viewed in FIG. 2. The rotor 47 is formed with a conical outer surface 53 conjugate to the bore 52 in such a manner that the diameter of the rotor 47 increases from left to right as viewed in FIG. 2.

The inner surface of the bore 52 is formed with longitudinal grooves 54 and 56. The depth of the grooves 54 and 56 decreases as the diameter of the bore 52 increases. However, the bottoms of the grooves 54 and 56 do not extend radially inwardly in the direction of increasing diameter of the bore 52. As illustrated, the bottoms of the grooves 54 and 56 are parallel to the longitudinal axis of the sleeve 37.

In a similar manner, the outer surface of the rotor 47 is formed with longitudinal grooves 57 and 58. The depth of the grooves 57 and 58 increases as the diameter of the rotor 47 increases. However, the bottoms of the grooves 57 and 58 do not extend radially outwardly in the direction of increasing diameter of the rotor 47.

The groove 54 communicates with a hydraulic pressure source such as a pump (not shown) through passageways 59 which may be formed by simple drilling operations through the sleeve 37. The groove 56 communicates with a non-pressurized reservoir (not shown) through passageways 61.

As viewed in FIG. 3, a left space or land between the grooves 54 and 56 communicates with one end of a power piston for the steering system (not shown) through passageways 63. A right space or land between the grooves 54 and 56 communicates with the other end of the power piston through passageways 62.

In a neutral position of the sleeve 37 and rotor 47 as illustrated in FIG. 3, all of the passageways 59, 61, 62 and 63 communicate with each other and the hydraulic pressure on the ends of the power piston is equal. Thus, there is no net force on the power piston. The valve 31 assumes the neutral position when the actual steering angle is equal to the command steering angle.

When it is desired to turn the vehicle in one direction, the stub shaft 48 is rotated clockwise in FIG. 3. Due to the resistance of the steering gear the worm shaft 42 remains stationary while the torsion bar 51 is twisted to absorb the angular difference between the stub shaft 48 and worm shaft 42. In this case, the upper land of the rotor 47 mates with the right land of the sleeve 37 and blocks communication between the passageways 59 and the passageways 62. The lower land of the rotor 47 mates with the left land of the sleeve 37 to block communication between the passageways 61 and the passageways 63. The effect is that the end of the power piston connected to the passageways 62 is connected to the reservoir and the end of the power piston connected to the passageways 63 is connected to the source. The net force on the power piston assists the manual steering effort. The connection is opposite when the stub shaft 48 is turned in the opposite direction resulting in steering assistance in the opposite direction. The worm shaft 42 and sleeve 37 rotate with the steering gear until the actual steering angle equals the command steering angle and the sleeve 37 is aligned with the rotor 47 in the relative position illustrated in FIG. 3.

The angles of the bottoms of the grooves 54, 56, 57 and 58 are extremely important in that they enable the sleeve 37 and rotor 47 to be manufactured in one piece molds by casting, forging, sintering or a like process. This eliminates machining of the grooves and removal of flash marks which result from the use of two piece molds. Thus, the valve 31 can be manufactured very easily and cheaply on a commercial production basis.

Referring to FIG. 2, the bottoms of the grooves 54, 56, 57 and 58 are parallel to the axis of rotor 47 and bore 52. This enables the sleeve 37 and rotor 47 to be pulled straight out of respective one piece molds. However, the bottoms of the grooves 54, 56, 57 and 58 do not have to be parallel to the axis of the valve 31. It is only necessary that the bottoms of the grooves 54 and 56 do not extend radially inwardly from left to right as viewed in FIG. 2 and that the bottoms of the grooves 57 and 58 not extend radially outwardly from left to right since this would make it impossible to remove the sleeve 37 and rotor 47 from their respective molds. The sleeve 37 could be removed from its mold if the bottoms of the grooves 54 and 56 extend radially outwardly whereas the rotor 47 could be removed from its mold if the bottoms of the grooves 57 and 58 extend radially inwardly as viewed from left to right in FIG. 2.

Any number of grooves may be provided to the sleeve and rotor to accommodate the desired function of the valve. In addition, the grooves may have even width or may taper inwardly or outwardly as will be described in detail below.

Figure 5:
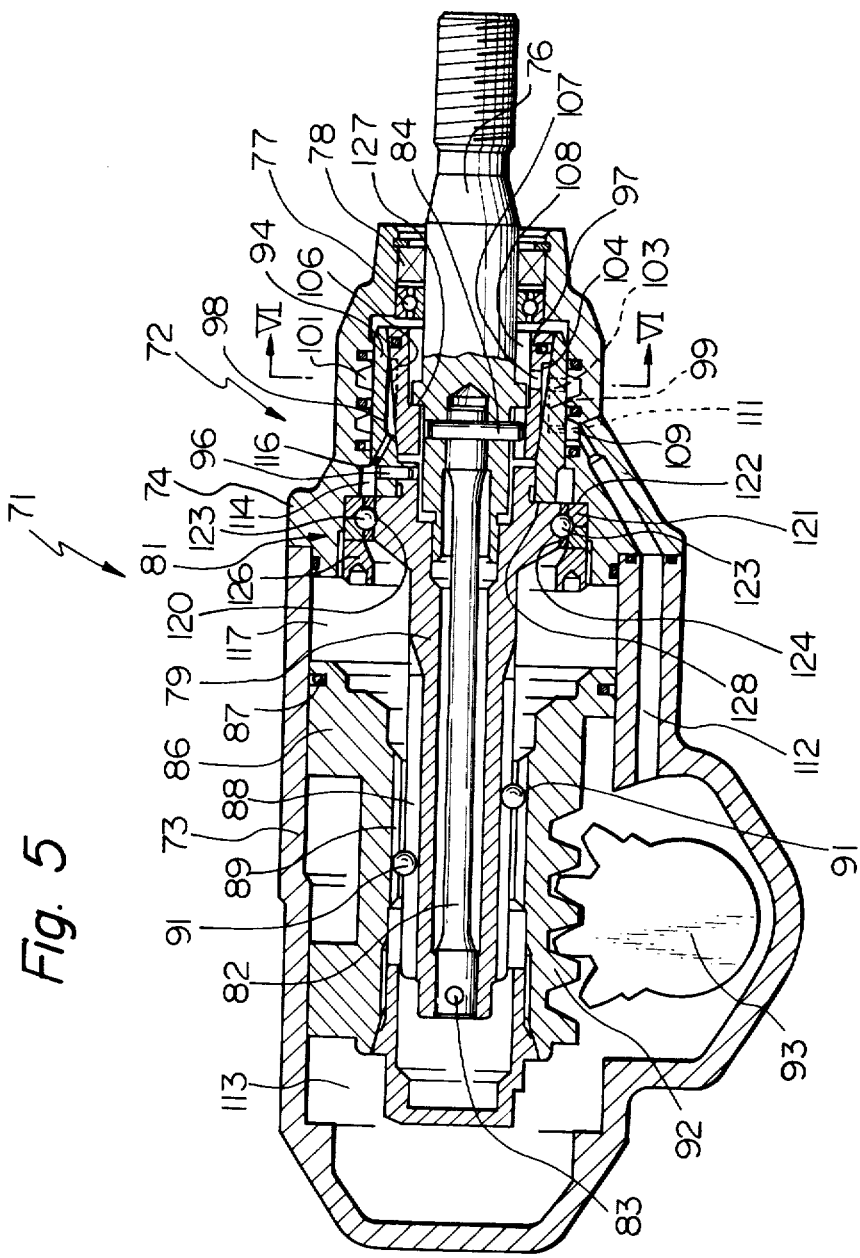
FIG. 5 is a longitudinal sectional view of a power steering system incorporating a rotary control valve of the present invention.
Figure 6:
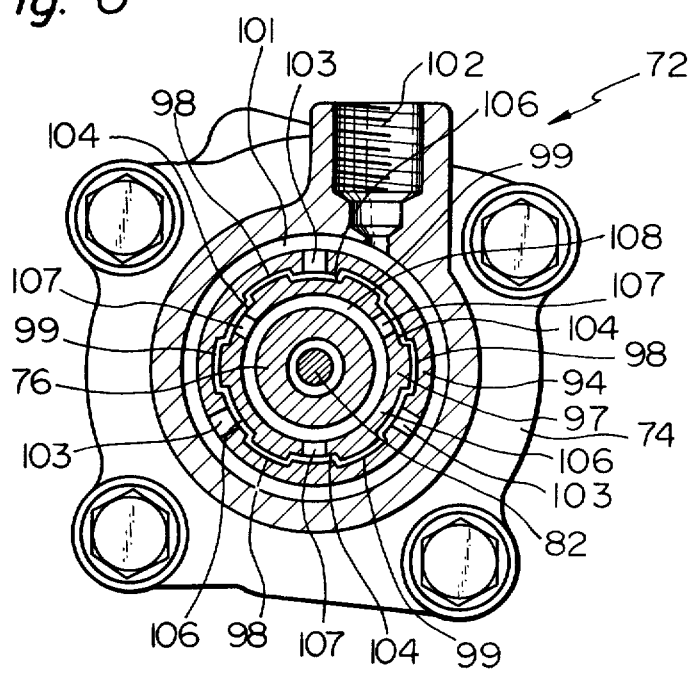
FIG. 6 is a transverse sectional view taken on a line VI—VI of FIG. 5.

FIGS. 5 and 6 illustrate a power steering system 71 incorporating a rotary control valve 72 embodying the present invention. The system 71 comprises a housing 73 which is attached to a housing 74 of the control valve 72. A stub shaft 76 is connected to a steering wheel (not shown) and is supported in the housing 72 by a bearing 77. An oil seal 78 is further provided to the shaft 76.

A worm shaft 79 is rotatably supported in the housing 73 by a bearing 81. A torsion bar 82 extends through a bore of the worm shaft 79 and is connected thereto at its left end by a pin 83. The right end of the torsion bar 79 is connected to the stub shaft 76 by a pin 84.

A power piston 86 is slidably disposed in the housing 73 and provided at its periphery with an O-ring seal 87. The periphery of the worm shaft 79 is formed with worm threads 88 whereas the inner surface of the power piston 86 is formed with conjugate worm threads 89. A plurality of balls 91 are provided in the threads 88 and 89 to constitute a ball screw mechanism. Rotation of the worm shaft 79 causes longitudinal movement of the power piston 86 in a direction corresponding to the direction of rotation of the worm shaft 79.

A rack 92 is formed on the lower surface of the power piston 86 and meshes with a pinion 93. The pinion 93 is connected to a steering gear assembly of the vehicle (not shown) such that rotation of the pinion 93 causes movement of steering members such as wheels in the desired direction.

The system 71 is capable of manual steering in case the power system fails. Rotation of the stub shaft 76 causes rotation of the worm shaft 79 through the torsion bar 82. This in turn causes the power piston 86 and rack 92 to move and rotate the pinion 93. The torsion bar 82 is twisted during the operation. The worm shaft 79 will begin to rotate when the torsional resistance of the torsion bar 79 equals the resistance of the steering system.

The valve 72 comprises a sleeve 94 having a conical bore (not designated) similar to the valve 31 and which is fixed to the worm shaft 79 by a pin 96. The valve 72 also comprises a rotor 97 having a conical outer surface (not designated) which is fixed to the stub shaft 76 by the pin 84.

As best seen in FIG. 6, the sleeve 94 is formed with three longitudinal grooves 98 which alternate with three longitudinal grooves 99. An annular groove 101 is formed in the housing 74 which communicates with a source of pressurized hydraulic fluid such as a pump (not shown) through an inlet 102. Passageways 103 lead from the groove 101 through the lands between adjacent grooves 98 and 99.

The rotor 97 is formed with three longitudinal grooves 104 which alternate with three longitudinal grooves 106. The shape of the grooves 98, 99 104 and 106 is the same as in the valve 31. Passageways 107 formed through the bottoms of the grooves 104 lead to an annular space 108 between the stub shaft 76 and rotor 97. The space 108 communicates with a non-pressurized reservoir for the hydraulic fluid (not shown).

An annular groove 109 is formed in the housing 74 which communicates with passageways 111 formed through the bottoms of the grooves 99. The groove 109 leads through a passageway 112 to a pressure chamber 113 at the left end of the power piston 86.

An annular space 114 between the worm shaft 86 and housing 74 communicates with passageways 116 formed through the bottoms of the grooves 98. The space 114 leads through the bearing 81 to a pressure chamber 117 at the right end of the power piston 86.

In the neutral position of the system 71 shown in FIG. 6, all grooves 98, 99, 104 and 106 communicate with each other so that pressurized fluid from the source is applied to both ends of the power piston 86 and there is no net force thereon. However, when the stub shaft 76 is rotated clockwise as seen in FIG. 6, clockwise edge portions of the lands between the grooves 104 and 106 mate with counterclockwise edge portions of the lands between the grooves 98 and 99. This has the effect of blocking communication between the grooves 99 and grooves 104 so that the grooves 99 are disconnected from the reservoir. However, the grooves 99 and thereby the left chamber 113 via the passageway 112, groove 109 and passageways 111 are connected to the source through the grooves 106, passageways 103, groove 101 and inlet 102.

At the same time, communication is blocked between the grooves 98 and grooves 106 so that the grooves 98 are disconnected from the pressure source. However, the grooves 98 and thereby the right chamber 117 via the bearing 81 and passageways 116 are connected to the reservoir through the grooves 104, passageways 107 and space 108. The result is that the pressurized fluid is applied to the left end of the power piston 86 but not to the right end thereof so that the power piston 86 is urged rightwardly for steering assistance. Naturally, the system 71 is designed so that the worm shaft 79 moves the power piston 86 rightwardly in FIG. 5 as the stub shaft 76 is rotated clockwise in FIG. 6 so that the steering assistance is in the same direction as the manual effort.

In an opposite manner, counterclockwise movement of the stub shaft 76 causes the counterclockwise edge portions of the lands between the grooves 104 and 106 to mate with the clockwise edge portions of the lands between the grooves 98 and 99. This has the effect of blocking communication between the grooves 98 and 104 and also blocking communication between the grooves 99 and 106. Thus, the left chamber 113 is connected to the reservoir through the passageway 112, groove 109, passageways 111, groove 99, groove 106, groove 104, passageways 107 and space 108. The right chamber 117 is connected to the source through the bearing 81, space 114, passageways 116, groove 98, groove 106, passageways 103, space 101 and inlet 102. Thus, the pressurized fluid is applied only to the right chamber 117 whereas the left chamber 113 is connected to the reservoir. This causes the power piston 86 to be moved leftwardly in FIG. 5 for steering assistance.

The bearing 81 comprises an inner race 120 constituted by a peripheral surface of the worm shaft 86 and an outer race 121. Rightward thrust of the worm shaft 86 is absorbed by the outer race 121 which abuts against a shoulder 122 of the housing 74. Balls 123 are disposed between the inner race 120 and outer race 121 and are retained by a ball retainer 124. Further illustrated is a retainer 126 which holds the outer race 121 in position.

Pressurized fluid in the grooves 98, 99, 104 and 106 causes the sleeve 94 to be urged leftwardly and the rotor 97 to be urged rightwardly. Rightward thrust of the rotor 97 is absorbed by a shoulder 127 of the stub shaft 76. Leftward thrust of the sleeve 94 is absorbed by a shoulder 128 of the worm shaft 86. The construction of the system 71 is simplified by forming the inner race 120 for the bearing 81 on the periphery of the worm shaft 86.

The axial position of the rotor 97 and thereby the clearance between the rotor 97 and sleeve 94 is determined by the shoulder 127 of the stub shaft 76. This is advantageous over the prior art in which a rotor must be positioned at both ends. The shoulder 127 may be replaced by a snap ring which even further facilitates the construction of the system 71.

Figure 7:
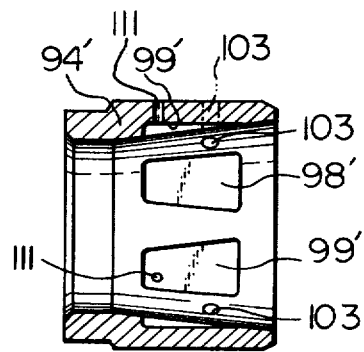
FIG. 7 is a longitudinal sectional view of a modified sleeve embodying the present invention.
Figure 8:
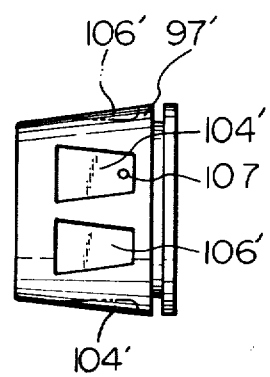
FIG. 8 is a plan view of a modified rotor embodying the present invention.

FIGS. 7 and 8 illustrate a modified sleeve 94' and rotor 97' respectively which are adapted to minimize sharp variations in pressure and flow rate upon rotation of the rotor 97'. In the sleeve 94', the grooves are modified as at 98' and 99' so that the width thereof increases as the diameter of the bore of the sleeve 94' increases. In the rotor 97', the grooves are modified as at 104' and 106' so that the width thereof decreases as the diameter of the rotor 97' increases. This has the effect of reducing the area of communication of the grooves and thereby reducing pressure and flow variations while still allowing the sleeve 94' and rotor 97' to be pulled straight out of one piece molds. If desired, only selected grooves or only one edge of each or selected grooves may be tapered.

Figure 9:
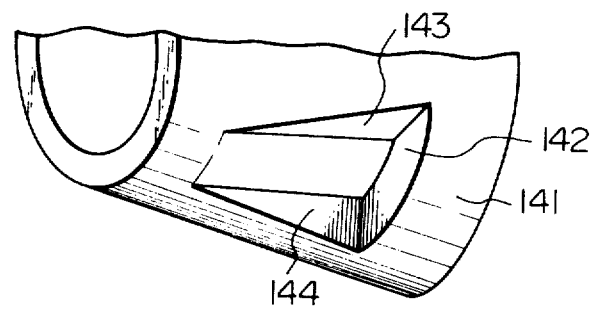
FIG. 9 is a fragmentary perspective view of another modified rotor.

It is also possible to provide the sleeve 94 and rotor 97 with grooves having reverse tapers as shown in FIG. 9. Here, a modified rotor is designated as 141 and provided with a groove 142 having a width which increases as the diameter of the rotor 141 increases. Although this would ordinarily prevent the rotor 141 from being pulled out of a one piece mold, the problem may be overcome by inclining walls 143 and 144 of the groove 142 in such a manner as to be parallel to the axis of the rotor 141. In other words, the walls 143 and 144 are inclined away from the interior of the groove 142 so as to be parallel to the axis of the rotor 141.

Figure 10:
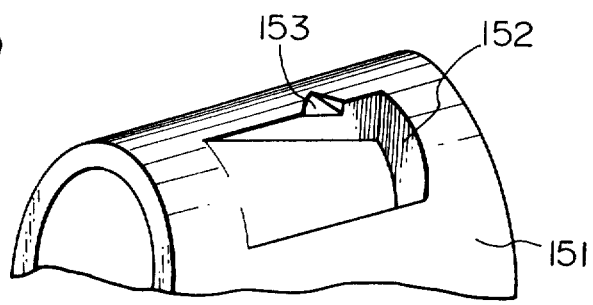
FIG. 10 is a fragmentary perspective view of another modified rotor.

Another rotor 151 is illustrated in FIG. 10 as being formed with a main groove 152 and a peripheral groove 153 which extends transversely outwardly from a central portion of the groove 152 and has a bottom which is parallel to the bottom of the groove 152. The peripheral groove 153 serves the same function as the tapering of the grooves in FIGS. 7 to 9 by decreasing the area of communication of the grooves and thereby abrupt pressure and flow variations.

Figure 11:
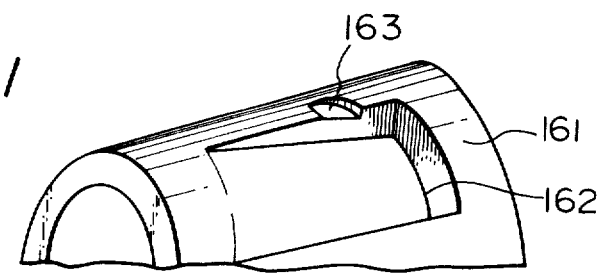
FIG. 11 is a fragmentary perspective view of yet another modified rotor.

Whereas the peripheral groove 153 in FIG. 10 has a triangular shape, a rotor 161 in FIG. 11 has a main groove 162 and a peripheral groove 163 with a semicircular shape.

In summary, it will be seen that the present invention overcomes the drawbacks of the prior art and provides a rotary control valve which is reliable in operation and may be produced easier and at much lower cost than comparable valves known heretofore. Various modifications will become possible for those skilled in the art after receiving the teachings of the present disclosure without departing from the scope thereof. For example, the sleeve 94 may be fixed in position in the housing 74 or connected to the stub shaft 76 rather than to the worm shaft 86. In the latter case, the rotor 97 would be connected to the worm shaft 86 rather than to the stub shaft 76.

What is claimed is:

1. A rotary valve comprising a sleeve formed with a conical bore and a rotor having a conical outer surface conjugate to the bore and being disposed therein for relative rotation, the sleeve being formed with a longitudinal internal groove which increases in depth but does not extend radially outwardly from an axis of the bore as a diameter of the bore increases, the rotor being formed with a longitudinal external groove which increases in depth but does not extend radially inwardly toward an axis of the rotor as a diameter of the rotor increases.

2. A valve as in claim 1, in which the sleeve and rotor are each formed with a port leading to the respective groove in such a manner that fluid flow between the ports is controlled by the grooves in accordance with a rotational position of the rotor relative to the sleeve.

3. A valve as in claim 1, in which the groove of the sleeve is parallel to the axis of the bore.

4. A valve as in claim 1, in which the groove of the rotor is parallel to the axis of the rotor.

5. A valve as in claim 1, in which the groove of the sleeve is formed in such a manner that a width thereof increases as the diameter of the bore increases.

6. A valve as in claim 1, in which the groove of the rotor is formed in such a manner that a width thereof decreases as the diameter of the rotor increases.

7. A valve as in claim 1, in which the groove of the sleeve is formed in such a manner that a width thereof decreases as the diameter of the bore increases, walls of the groove of the sleeve lying in respective planes which are parallel to the axis of the bore.

8. A valve as in claim 1, in which the groove of the rotor is formed in such a manner that a width thereof increases as the diameter of the rotor increases, walls of the groove of the rotor lying in respective planes which are parallel to the axis of the rotor.

9. A valve as in claim 1, in which the rotor is formed with a peripheral groove extending transversely outwardly from a central portion of the groove of the rotor, the peripheral groove increasing in depth but not extending radially inwardly toward the axis of the rotor as the diameter of the rotor increases.

10. A valve as in claim 9, in which the peripheral groove has a triangular shape.

11. A valve as in claim 9, in which the peripheral groove has a semicircular shape.

* * * * *